United States Patent
Yamasaki et al.

(10) Patent No.: US 11,025,123 B2
(45) Date of Patent: Jun. 1, 2021

(54) MOTOR AND FAN MOTOR

(71) Applicant: Nidec Corporation, Kyoto (JP)

(72) Inventors: Yuta Yamasaki, Kyoto (JP); Takaya Okuno, Kyoto (JP); Yoshihisa Kitamura, Kyoto (JP); Tadayuki Kanatani, Kyoto (JP); Hideki Aoi, Kyoto (JP); Shoki Yamazaki, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 80 days.

(21) Appl. No.: 15/984,456

(22) Filed: May 21, 2018

(65) Prior Publication Data

US 2018/0337573 A1    Nov. 22, 2018

(30) Foreign Application Priority Data

May 22, 2017    (JP) .............................. JP2017-100621

(51) Int. Cl.
| | |
|---|---|
| *H02K 5/10* | (2006.01) |
| *H02K 1/27* | (2006.01) |
| *F04D 25/06* | (2006.01) |
| *H02K 7/14* | (2006.01) |
| *F04D 29/08* | (2006.01) |

(Continued)

(52) U.S. Cl.
CPC ............... *H02K 5/10* (2013.01); *F04D 25/06* (2013.01); *F04D 25/0613* (2013.01); *F04D 25/0646* (2013.01); *F04D 29/083* (2013.01); *H02K 1/12* (2013.01); *H02K 1/14* (2013.01); *H02K 1/2786* (2013.01); *H02K 7/14* (2013.01); *H02K 5/1737* (2013.01)

(58) Field of Classification Search
CPC .... H02K 5/1737; H02K 5/10; H02K 15/0043; H02K 1/2786
USPC ................. 310/67 R, 43, 45, 66, 85–88, 194
See application file for complete search history.

(56) References Cited

U.S. PATENT DOCUMENTS

| | | | | |
|---|---|---|---|---|
| 3,688,137 A | * | 8/1972 | Filhol ................... | H01B 3/002 |
| | | | | 310/43 |
| 6,278,207 B1 | * | 8/2001 | Matsumoto ........... | F04D 29/083 |
| | | | | 310/68 R |

(Continued)

FOREIGN PATENT DOCUMENTS

| | | |
|---|---|---|
| CN | 101431260 A | 5/2009 |
| JP | 06-14496 A | 1/1994 |

(Continued)

*Primary Examiner* — Quyen P Leung
*Assistant Examiner* — Alexander Moraza
(74) *Attorney, Agent, or Firm* — Keating & Bennett

(57) ABSTRACT

A motor includes a stator unit and a rotor rotatable relative to the stator unit. The stator unit includes a stator, a resin portion, a support portion, and an annular recess. The stator includes a stator core, an insulator, and a conducting wire wound around the stator core with the insulator interposed therebetween. The resin portion covers at least part of the stator. The support portion supports the stator. At an end portion of the stator unit on one side in an axial direction, the recess is recessed toward another side in the axial direction. The resin portion is positioned further in a radially outer direction than the recess. The rotor includes an annular projection extending toward the other side in the axial direction. At least part of the projection is accommodated in the recess.

9 Claims, 2 Drawing Sheets

(51) Int. Cl.
    *H02K 1/12*   (2006.01)
    *H02K 1/14*   (2006.01)
    *H02K 5/173*  (2006.01)

(56) References Cited

U.S. PATENT DOCUMENTS

| | | | |
|---|---|---|---|
| 8,492,939 B2 | 7/2013 | Hasegawa et al. | |
| 9,605,682 B2 | 3/2017 | Hasegawa et al. | |
| 2004/0145250 A1* | 7/2004 | Kudo | F04D 25/0633 310/43 |
| 2011/0074230 A1* | 3/2011 | Hasegawa | F04D 29/023 310/43 |
| 2012/0319543 A1* | 12/2012 | Adachi | H02K 5/10 310/68 R |
| 2013/0049551 A1* | 2/2013 | Tamaoka | H02K 1/146 310/67 R |
| 2013/0270931 A1* | 10/2013 | Handa | H02K 1/32 310/43 |
| 2014/0248164 A1* | 9/2014 | Chang | F04D 29/646 417/354 |
| 2014/0294621 A1* | 10/2014 | Narita | F04D 25/0646 417/354 |
| 2015/0198176 A1* | 7/2015 | Tamaoka | F04D 29/5853 361/679.49 |

FOREIGN PATENT DOCUMENTS

| | | |
|---|---|---|
| JP | 10-191611 A | 7/1998 |
| JP | 11-82478 A | 3/1999 |
| JP | 2001-086689 A | 3/2001 |
| JP | 2003-333787 A | 11/2003 |
| JP | 2007-053844 A | 3/2007 |
| JP | 2008-109848 A | 5/2008 |
| JP | 2013-021903 A | 1/2013 |
| JP | 2014-209837 A | 11/2014 |
| JP | 5956201 B2 | 7/2016 |
| TW | 2004-17112 A | 9/2004 |

* cited by examiner

MOTOR AND FAN MOTOR

CROSS REFERENCE TO RELATED APPLICATIONS

This application claims the benefit of priority to Japanese Patent Application No. 2017-100621 filed on May 22, 2017. The entire contents of this application are hereby incorporated herein by reference.

BACKGROUND OF THE INVENTION

1. Field of the Invention

The present disclosure relates to a motor and a fan motor.

2. Description of the Related Art

There have been a variety of attempts to improve waterproof properties and dust proof properties of related-art motors. For example, Japanese Laid-open Patent Application Publication 10-191611 discloses a brushless fan motor in which a stator is integrally molded with silicone rubber. In this motor, in order to prevent water from entering a case, a projection projecting from a bush of a rotor is inserted into a gap between an insulator of the stator and a bearing-supporting cylinder at an upper end portion of the stator in the axially upper direction.

However, according to Japanese Laid-open Patent Application Publication 10-191611, the insulator is covered with silicone rubber on the radially inner side in the gap. This further reduces the width of the gap in the radial direction and the depth of the gap in the axial direction. Thus, there is a possibility of not sufficiently improving the waterproof properties and the dustproof properties.

SUMMARY OF THE INVENTION

In order to achieve the above-described object, according to an exemplary embodiment of the present disclosure, an outer-rotor-type motor includes a stator unit and a rotor. The rotor is rotatable relative to the stator unit about a central axis extending in an upper-lower direction. The stator unit includes a stator, a resin portion, a support portion, and a recess. The stator includes a stator core, an insulator, and a conducting wire wound around the stator core with the insulator interposed therebetween. The resin portion covers at least part of the stator. The support portion supports the stator. At an end portion of the stator unit on one side in an axial direction, the recess having an annular shape is recessed toward another side in the axial direction. The resin portion is positioned further in a radially outer direction than the recess at the end portion of the stator unit on the one side in the axial direction. A first side surface of the recess on a radially inner side is an outer side surface of the support portion on a radially outer side. A second side surface of the recess on the radially outer side is an inner side surface of the insulator on the radially inner side. The rotor includes an annular projection extending toward the other side in the axial direction. At least part of the projection is accommodated in the recess.

Furthermore, in order to achieve the above-described object, according to an exemplary embodiment of the present disclosure, a fan motor includes an impeller rotatable about a central axis and the above-described motor that rotates the impeller.

With the exemplary motor and the exemplary fan motor according to the present disclosure, the waterproof properties and the dustproof properties can be improved.

The above and other elements, features, steps, characteristics, and advantages of the present disclosure will become more apparent from the following detailed description of the preferred embodiment with reference to the attached drawings.

DETAILED DESCRIPTION OF THE PREFERRED EMBODIMENTS

An exemplary embodiment of the present disclosure will be described below with reference to the drawings.

Herein, a direction parallel to a central axis CA is referred to as "axial direction" in a fan motor 100. Furthermore, a direction toward one side in the axial direction directed from a lid portion 23 toward a shaft holder 11, which will be described later, in the axial direction is referred to as "upper direction". In contrast, a direction toward the other side in the axial direction directed from the shaft holder 11 toward the lid portion 23 in the axial direction is referred to as "lower direction". Furthermore, regarding elements, an end portion of each of the elements in the axially lower direction is referred to as "lower end portion", and an end portion of the element in the axially upper direction is referred to as "upper end portion". Furthermore, out of surfaces of the elements, surfaces facing in the axially lower direction are referred to as "lower surfaces", and surfaces facing in the axially upper direction are referred to as "upper surfaces".

Furthermore, a direction that perpendicularly intersects the central axis CA is referred to as "radial direction", and a circumferential direction centered at the central axis CA is referred to as "circumferential direction". Furthermore, a direction directed toward the central axis CA in the radial direction is referred to as "inner direction", and a direction directed so as to be separated from the central axis CA in the radial direction is referred to as "outer direction". Furthermore, an end portion of each of the elements in the radially inner direction is referred to as "inner end portion", and an end portion of the element in the radially outer direction is referred to as "outer end portion". Furthermore, out of side surfaces of the elements, side surfaces facing in the radially inner direction are referred to as "inner side surfaces", and side surfaces facing in the radially outer direction are referred to as "outer side surfaces".

However, it should be understood that the designations such as directions, end portions, and surfaces described above do not represent the positional relationships, the directions, and so forth when actually assembled in an apparatus.

Figure 1:
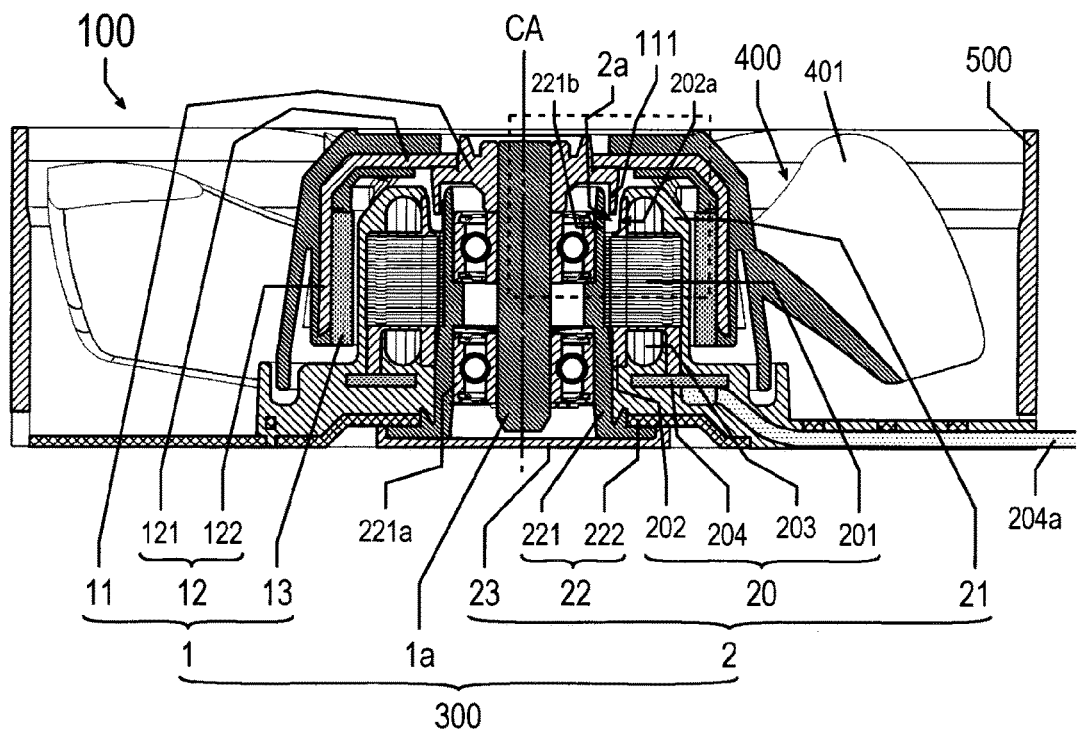
FIG. 1 is a sectional view of an example of a fan motor.

FIG. 1 is a sectional view of an example of the fan motor 100, illustrating a sectional structure of the fan motor 100 including the central axis CA.

As illustrated in FIG. 1, the fan motor 100 includes a motor 300 of an outer-rotor type, an impeller 400, and a casing 500. The motor 300 is a drive device that rotates the impeller 400. The impeller 400 is a vane wheel that includes a plurality of vane portions 401. The impeller 400 including the vane portions 401 is rotatable about the central axis CA. The impeller 400 is attached to an upper portion of the motor 300 in the axial direction. The impeller 400 is rotated about the central axis CA by the motor 300, thereby generating an airflow flowing in the axial direction. The casing 500 accommodates the motor 300 and the impeller 400.

Next, the structure of the motor 300 is described. As illustrated in FIG. 1, the motor 300 includes a rotor 1, a shaft 1a, and a stator unit 2.

The rotor 1 is rotatable relative to the stator unit 2 about the central axis CA extending in the upper-lower direction. The rotor 1 includes the shaft holder 11, a magnet support member 12, and a magnet 13. The shaft holder 11 is attached to the shaft 1a at an upper end portion of the motor 300 in the axially upper direction. The shaft holder 11 is provided with a projection 111 having an annular shape when seen in the axial direction. That is, the rotor 1 includes the projection 111. The projection 111 extends in the axially lower direction from the shaft holder 11. The projection 111 is not limited to the example illustrated in FIG. 1. The projection 111 may extend from the magnet support member 12. The magnet support member 12 holds the magnet 13. The magnet support member 12 includes a plate portion 121 and a cylindrical portion 122. The plate portion 121 having an annular shape extends in the radially outer direction from the shaft holder 11. The cylindrical portion 122 having a cylindrical shape extends at least in the axially lower direction from an outer end portion of the plate portion 121 in the radially outer direction. The magnet 13 is positioned further in the radially outer direction than a stator 20 of the stator unit 2, which will be described later. The magnet 13 is held by an inner side surface of the cylindrical portion 122 and faces an outer side surface of the stator 20.

The shaft 1a is a rotational shaft attached to the rotor 1, supports the rotor 1, and is rotatable together with the rotor 1 about the central axis CA. The shaft 1a is not limited to this example. The shaft 1a may be a fixed shaft attached to the stator unit 2. When the shaft 1a is a fixed shaft, a bearing (not illustrated) interposed between the rotor 1 and the shaft 1a is provided for the shaft 1a.

The stator unit 2 is a stationary portion held by the casing 500 and supports the rotor 1 rotatable about the central axis CA. The stator unit 2 includes the stator 20, a recess 2a, a resin portion 21, a fixing portion 22, and the lid portion 23. The recess 2a will be described later. The stator unit 2 is fixed to the casing 500 by the fixing portion 22.

The stator 20 drives and rotates the rotor 1 when the motor 300 is driven. The stator 20 has an annular shape centered at the central axis CA and is fixed to a radially outer side of a support portion 221. The stator 20 includes a stator core 201, an insulator 202, a plurality of coil portions 203, and a substrate 204. The stator core 201 is an iron-core member that includes, for example, a laminated steel sheet in which electromagnetic steel sheets are laminated in the axial direction. The stator core 201 faces the magnet 13 of the rotor 1 in the radial direction. The insulator 202 is an insulating member formed of, for example, a resin material. The insulator 202 covers at least part of the stator core 201. In the stator 20, conducting wires are wound around the stator core 201 with the insulator 202 interposed therebetween, thereby the coil portions 203 are provided. The substrate 204 is electrically connected to the conducting wires of the coil portions 203 and connection 204a extending to the outside of the motor 300.

The resin portion 21 covers at least part of the stator 20. The resin portion 21 is positioned further in the radially outer direction than the recess 2a at the upper end portion of the stator unit 2 in the axially upper direction. This can further increase the width of the recess 2a in the radial direction. With the recess 2a increased in size, a space where the projection 111 is accommodated can be reliably obtained. Accordingly, entrance of moisture and dust can be more effectively suppressed. Furthermore, an upper end portion of the resin portion 21 in the axially upper direction is positioned further in the axially upper direction than an upper end portion of the insulator 202 in the axially upper direction. This further increases the length of the entering path for the moisture and the dust from the radially outer side to the upper end portion of the support portion 221 in the axially upper direction because the moisture and the dust additionally pass through a space between the projection 111 and the resin portion 21. This further reduces the likelihood of the moisture and the dust entering the upper end portion of the support portion 221.

The fixing portion 22 fixes the stator 20 to the casing 500. The fixing portion 22 includes the support portion 221 and an attachment portion 222. That is, the stator unit 2 includes the support portion 221 and the attachment portion 222.

The support portion 221 having a cylindrical shape supports the stator 20. Bearings 221a are provided in the support portion 221, and further, the shaft 1a is inserted into the support portion 221. The shaft 1a is rotatably supported by the support portion 221 with the bearings 221a interposed therebetween. Although the bearings 221a are ball bearings according to the present embodiment, this example is not limiting. The bearings 221a may be, for example, sleeve bearings or the like.

The attachment portion 222 having an annular shape through which a plurality of through openings are formed is used to attach the stator unit 2 to the casing 500. More specifically, the stator 20 and the support portion 221 are attached to the casing 500, which accommodates the stator unit 2, by using the attachment portion 222. The support portion 221 is attached to an inner end portion of the attachment portion 222 in the radially inner direction. Furthermore, an outer end portion of the attachment portion 222 in the radially outer direction is attached to the casing 500. Furthermore, at least part of the attachment portion 222 is covered with the resin portion 21.

The lid portion 23 is fitted onto a lower end portion of the support portion 221 in the axially lower direction so as to cover the lower end portion.

Figure 2:
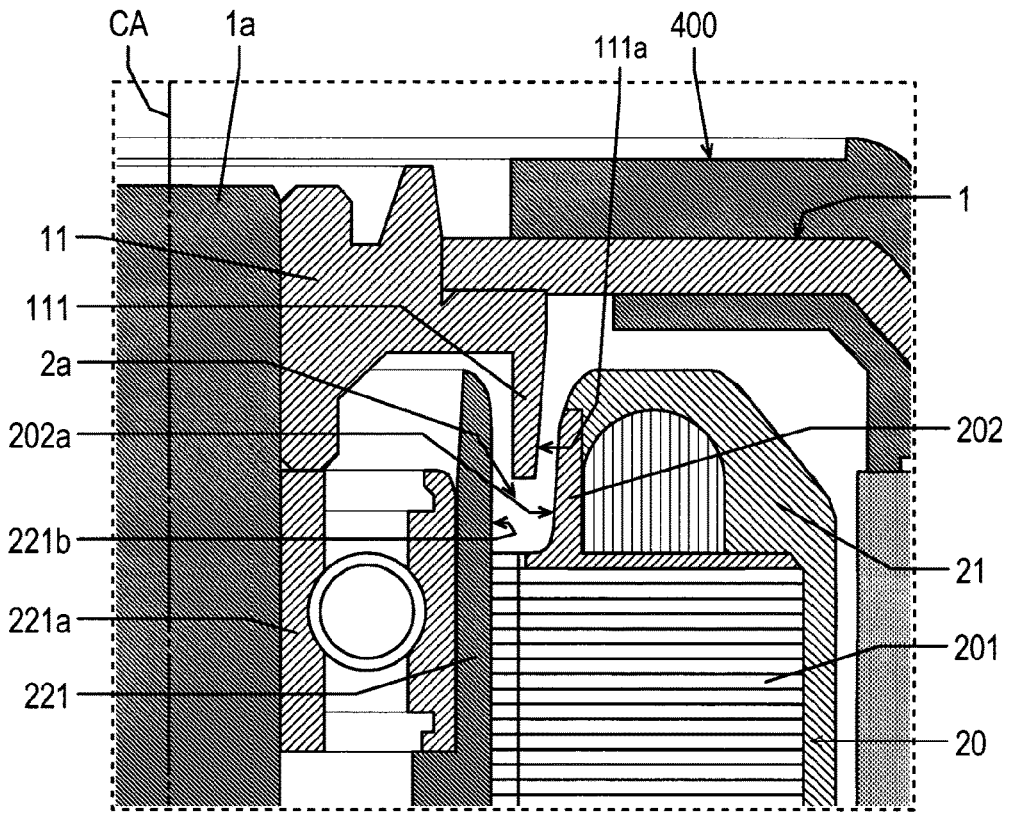
FIG. 2 is a sectional view of an example of a labyrinth structure formed by a recess and a projection.

Next, an example of the structure of the recess 2a is described. The recess 2a has an annular shape when seen in the axial direction. The recess 2a together with at least part of the projection 111 forms a labyrinth structure at the upper end portion of the stator unit 2 in the axially upper direction. FIG. 2 is a sectional view of an example of the labyrinth structure formed by the recess 2a and the projection 111, illustrating a sectional structure of the recess 2a and a region near the recess 2a of the fan motor 100 according to the present embodiment when seen in the radial direction. FIG. 2 corresponds to, for example, a portion of FIG. 1 surrounded by a broken line.

As illustrated in FIG. 2, the recess 2a is provided between the insulator 202 and the support portion 221 at an upper end portion of the stator unit 2 in the axially upper direction. The recess 2a is recessed in the axially lower direction. A first side surface 221b of the recess 2a on the radially inner side is an outer side surface 221b of the support portion 221. A second side surface 202a of the recess 2a on the radially outer side is an inner side surface 202a of the insulator 202. The at least part of the projection 111 is accommodated in the recess 2a.

In this way, the labyrinth structure in which the at least part of the projection 111 of the rotor 1 is accommodated in the recess 2a between the support portion 221 and the insulator 202 is provided at the upper end portion of the stator unit 2 in the axially upper direction. Furthermore, the resin portion 21 is positioned further in the radially outer direction than the recess 2a at the upper end portion of the stator unit 2. Thus, compared to the case where, for example, the resin portion 21 is provided in the recess 2a, the size of the labyrinth structure formed by the recess 2a and the projection 111 can be further increased. That is, the length of an entering path for the moisture and the dust from the radially outer side to the upper end portion of the support portion 221 in the axially upper direction can be further increased. This reduces the likelihood of the moisture and the dust entering the upper end portion of the support portion 221. Accordingly, the waterproof properties and the dustproof properties of the motor 300 can be improved. These effects are particularly useful for the motor 300 having a small size.

Furthermore, when the resin portion 21 is not provided in the recess 2a, the amount of the resin portion 21 used to cover the stator 20 can be reduced. This can contribute to reduction of the production cost.

The at least part of the projection 111 in the recess 2a directly faces the support portion 221 and the insulator 202 in the radial direction. In this way, the width of an inner space of the recess 2a in the radial direction can be increased more than in the case where the at least part of the projection 111 in the recess 2a faces the insulator 202 with, for example, the resin portion 21 provided in the recess 2a interposed therebetween. Thus, the inner space of the recess 2a accommodating the projection 111 can be reliably obtained. This further reduces the likelihood of the moisture and the dust entering the upper end portion of the support portion 221. Furthermore, the dimensions of the recess 2a can be more easily controlled. Thus, allowance in the design of the motor 300 is obtained. Furthermore, the labyrinth structure that is compact and that is sufficient to suppress or prevent entering of the water and the dust can be provided at the upper end portion of the stator unit 2 in the axially upper direction.

An outer diameter of the recess 2a in the radial direction increases from the lower side toward the upper side in the axial direction. That is, as illustrated in FIG. 2, the second side surface 202a of the recess 2a has a tapered shape inclined in the radially outer direction toward the upper side in the axial direction in a sectional view seen in the radial direction. In this way, when the fan motor 100 is disposed such that, for example, the central axis CA is perpendicular to the vertical line, the water and the dust adhering to the second side surface 202a of the recess 2a are gathered on the lower side of the second side surface 202a along the vertical line, and after that, flow in the axially upper direction along the second side surface 202a. Thus, the water and the dust adhering to the second side surface 202a are likely to be discharged to the outside of the recess 2a.

Furthermore, as in the sectional view seen in the radial direction illustrated in FIG. 2, the second side surface 202a of the recess 2a is smoothly continuous with a surface of the resin portion 21. For example, in the sectional view seen in the radial direction, the tangential direction of an upper end portion of the second side surface 202a in the axially upper direction is the same as the tangential direction of an inner end portion of the resin portion 21 in the radially inner direction at the upper end portion of the stator unit 2. In this way, the water and the dust being discharged to the outside of the recess 2a can be moved onto the resin portion 21 without delay.

Furthermore, an outer diameter of the projection 111 in the radial direction increases from the lower side toward the upper side in the axial direction. That is, as illustrated in FIG. 2, an outer side surface 111a of the projection 111 in the radially outer direction has a tapered shape inclined in the radially outer direction toward the upper side in the axial direction. It is assumed that the water and the dust adhere to the outer side surface 111a of the projection 111 of the rotor 1 in the recess 2a. Even in this case, with the above-described structure, when the rotor 1 is rotated, the water and the dust are moved due to the centrifugal force in the axially upper direction in which the outer diameter of the projection 111 (that is, the diameter of the outer side surface 111a) increases. Thus, due to the rotation of the rotor 1, the water and the dust can be discharged to the outside of the recess 2a.

Figure 3:
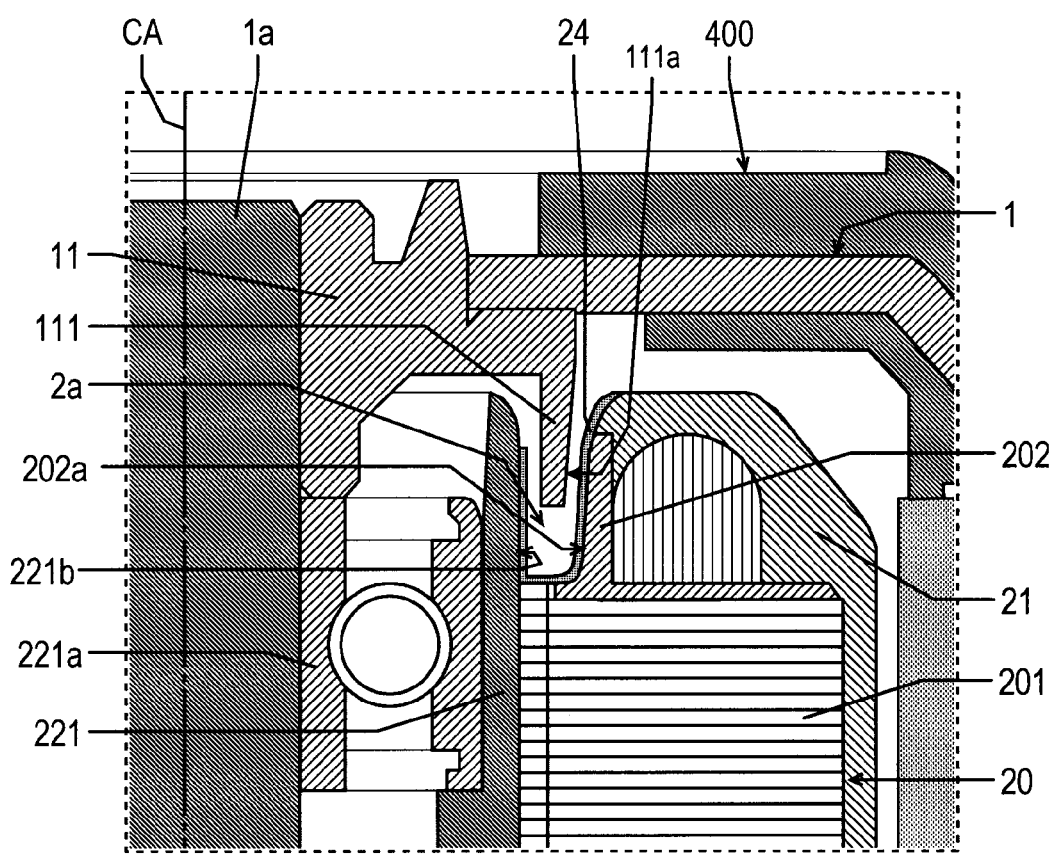
FIG. 3 is a sectional view of another example of the labyrinth structure formed by the recess and the projection.

Next, a modification of the embodiment is described. FIG. 3 is a sectional view of another example of the labyrinth structure formed by the recess 2a and the projection 111, illustrating a sectional structure of the recess 2a and a region near the recess 2a of the fan motor 100 according to the modification of the present embodiment when seen in the radial direction. FIG. 3 corresponds to, for example, the portion of FIG. 1 surrounded by a broken line.

As illustrated in FIG. 3, the motor 300 further includes a protective portion 24 that is different from the resin portion 21. The protective portion 24 is a thin film provided on part of an outer surface of the resin portion 21 at the upper end portion of the stator unit 2 and a bottom surface, the first side surface 221b, and the second side surface 202a of the recess 2a. In particular, as illustrated in FIG. 3, the protective portion 24 covers an end portion of an interface between the insulator 202 and the resin portion 21 and an end portion of an interface between the insulator 202 and the support portion 221. However, the protective portion 24 is not limited to the example illustrated in FIG. 3. The protective portion 24 may cover one of the above-described end portions of the interfaces. That is, it is sufficient that the protective portion 24 cover at least one of the end portion of the interface between the insulator 202 and the resin portion 21 and the end portion of the interface between the insulator 202 and the support portion 221.

The material of the protective portion 24 is, for example, a silicone-based resin, a modified silicone-based resin, or an epoxy-based resin. Although the thickness of the protective portion 24 is not particularly limited, it is preferable that the thickness of the protective portion 24 be 10% or smaller than a minimum distance between the first side surface 221b and the second side surface 202a in the radial direction.

When the protective portion 24 is provided in the labyrinth structure at the upper end portion of the stator unit 2, it becomes unlikely that the water and the dust enter the above-described interfaces through the end portions of the interfaces. This reduces the likelihood of the water and the dust arriving at metal portions of the stator 20 such as, for example, a stator core 201 and coil portions 203. Accordingly, the waterproof properties and the dustproof properties of the motor 300 can be further improved.

Furthermore, although the protective portion 24 is a thin film provided on the inner surfaces of the recess 2a and so forth according to the present embodiment, this is not limiting. The protective portion 24 may be a member disposed between the recess 2a and the projection 111 or a member filled into the recess 2a. For example, the protective portion 24 may be a gasket formed of a rubber-based material, a silicone-based material, or the like. In such a case, it is sufficient that the protective portion 24 be disposed such that contact of the protective portion 24 with the projection 111 is avoided. Alternatively, the protective portion 24 may be formed of a material that is highly slidable against the inner surfaces of the recess 2a, the projection 111, or the inner surfaces of the recess 2a and the projection 111.

The embodiment according to the present disclosure has been described. The scope of the present disclosure is not limited to the above-described embodiment. The present disclosure can be carried out by making a variety of changes without departing from the gist of the invention. Features of the above-described preferred embodiment may be combined appropriately as long as no conflict arises.

For example, although the fan motor 100 is an axial flow fan according to the above-described embodiment, this is not limiting. The fan motor 100 may be a centrifugal fan. That is, the fan motor 100 may generate an airflow flowing to the outside in the radial direction.

The present disclosure is useful for, for example, a motor or the like that includes a stator unit in which the stator is covered by a resin portion.

Features of the above-described preferred embodiment and the modification thereof may be combined appropriately as long as no conflict arises.

While a preferred embodiment of the present invention has been described above, it is to be understood that variations and modifications will be apparent to those skilled in the art without departing from the scope and spirit of the present invention. The scope of the present invention, therefore, is to be determined solely by the following claims.

What is claimed is:

1. An outer-rotor-type motor comprising:
    a stator unit including:
        a stator including:
            a stator core,
            an insulator, and
            a conducting wire wound around the stator core with the insulator interposed between the stator core and the conducting wire,
        a resin portion covering at least part of the stator, and
        a support portion supporting the stator,
    the stator unit including an annular recess at least partially defined in a portion of the insulator at an end portion of the stator unit on one side in an axial direction, the recess being recessed toward another side in the axial direction, the recess being structured such that an entirety of the resin portion is positioned further to an outer side in a radial direction than the recess at the end portion of the stator unit on the one side in the axial direction, the recess including a first side surface on an inner side in the radial direction, the first side surface being an outer side surface of the support portion on the outer side in the radial direction, the recess including a second side surface on the outer side in the radial direction, the second side surface being an inner side surface of the insulator on the inner side in the radial direction, the recess being defined by portions of the inner side surface of the insulator and the outer side surface of the support portion which are directly opposed to one another without any intervening elements being in direct contact with either of the inner side surface of the insulator or the outer side surface of the support portion;
    a rotor rotatable relative to the stator unit about a central axis extending in an upper-lower direction, the rotor including:
        an annular projection extending toward the other side in the axial direction, the projection at least partially being accommodated in the recess; and
    an end of the resin portion is above the insulator on the one side in the axial direction, and the end of the resin portion and the support portion oppose each other in the radial direction.

2. The motor according to claim 1,
    wherein at least a portion of the projection in the recess directly opposes the support portion and the insulator in the radial direction.

3. The motor according to claim 1, further comprising:
    a protective portion that is different from the resin portion and that covers at least one of an end portion of an interface between the insulator and the resin portion and an end portion of an interface between the insulator and the support portion.

4. The motor according to claim 3,
    wherein a thickness of the protective portion is 10% or smaller than a minimum distance between the first side surface and the second side surface in the radial direction.

5. The motor according to claim 1,
    wherein, in the axial direction, an end portion of the resin portion on the one side is positioned further to the one side than an end portion of the insulator on the one side.

6. The motor according to claim 1,
    wherein an outer diameter of the projection in the radial direction increases from the other side toward the one side in the axial direction.

7. The motor according to claim 1,
    wherein an outer diameter of the recess in the radial direction increases from the other side toward the one side in the axial direction.

8. The motor according to claim 1,
    wherein the second side surface of the recess is smoothly continuous with a surface of the resin portion.

9. A fan motor comprising:
    an impeller rotatable about a central axis; and
    the motor according to claim 1 that rotates the impeller.

* * * * *